(12) United States Patent
McClain

(10) Patent No.: US 9,339,012 B2
(45) Date of Patent: May 17, 2016

(54) METHOD AND APPARATUS FOR ANIMAL GROOMING

(71) Applicant: Nancy McClain, Medina, OH (US)

(72) Inventor: Nancy McClain, Medina, OH (US)

( * ) Notice: Subject to any disclaimer, the term of this patent is extended or adjusted under 35 U.S.C. 154(b) by 88 days.

(21) Appl. No.: 14/469,173

(22) Filed: Aug. 26, 2014

(65) Prior Publication Data

US 2016/0057974 A1  Mar. 3, 2016

(51) Int. Cl.
  *A01K 15/00* (2006.01)
  *A01K 15/04* (2006.01)
  *A01K 27/00* (2006.01)

(52) U.S. Cl.
  CPC ............... *A01K 15/04* (2013.01); *A01K 27/002* (2013.01)

(58) Field of Classification Search
  CPC . A01K 1/0263; A01K 1/0254; A01K 27/002; A01K 1/029
  USPC ................... 119/725, 728, 756, 792, 907, 497
  See application file for complete search history.

(56) References Cited

U.S. PATENT DOCUMENTS

| | | | | | |
|---|---|---|---|---|---|
| 163,378 | A | * | 5/1875 | Johnson | A01K 1/0613 119/725 |
| 1,277,052 | A | * | 8/1918 | Dunn | A01K 1/0613 119/725 |
| 4,550,686 | A | * | 11/1985 | Munks | A61D 3/00 119/725 |
| 4,644,902 | A | * | 2/1987 | Doyle | A01K 1/0263 119/497 |
| 4,831,967 | A | * | 5/1989 | Anderson | A01K 15/00 119/725 |
| 5,150,667 | A | * | 9/1992 | Salidrigas | A01K 27/002 119/863 |
| 5,738,043 | A | * | 4/1998 | Manuel | A01K 1/0254 119/497 |
| 5,823,146 | A | * | 10/1998 | Alaniz | A61D 3/00 119/725 |
| 5,894,817 | A | * | 4/1999 | Manuel | A01K 1/0263 119/497 |
| 8,418,658 | B1 | * | 4/2013 | Remick | A01K 27/002 119/792 |
| 8,474,412 | B1 | * | 7/2013 | Walden | A01K 1/0263 119/725 |
| D734,567 | S | * | 7/2015 | Broder | D29/122 |
| 2005/0076853 | A1 | * | 4/2005 | Leo | A01K 1/0263 119/497 |
| 2005/0263102 | A1 | * | 12/2005 | Sherman | A01K 1/0263 119/792 |

* cited by examiner

*Primary Examiner* — Yvonne Abbott-Lewis
(74) *Attorney, Agent, or Firm* — Roger D. Emerson; Emerson Thomson Bennett, LLC

(57) ABSTRACT

The present invention is a method and apparatus for safely and securely holding and supporting an animal while it is being groomed. The disclosed apparatus can have multiple support members that wrap around an animal, passing under the animal's belly, around the hips and shoulders, and up over the back where it can be secured to a frame or post to keep the animal stable and supported, without restraining the animal by the neck, while undergoing a grooming procedure. The cutouts and support members that make up the leg holes in the apparatus can be lined with a soft material, such as fleece, to provide comfort and prevent chafing to the animal's skin during the procedure.

12 Claims, 4 Drawing Sheets

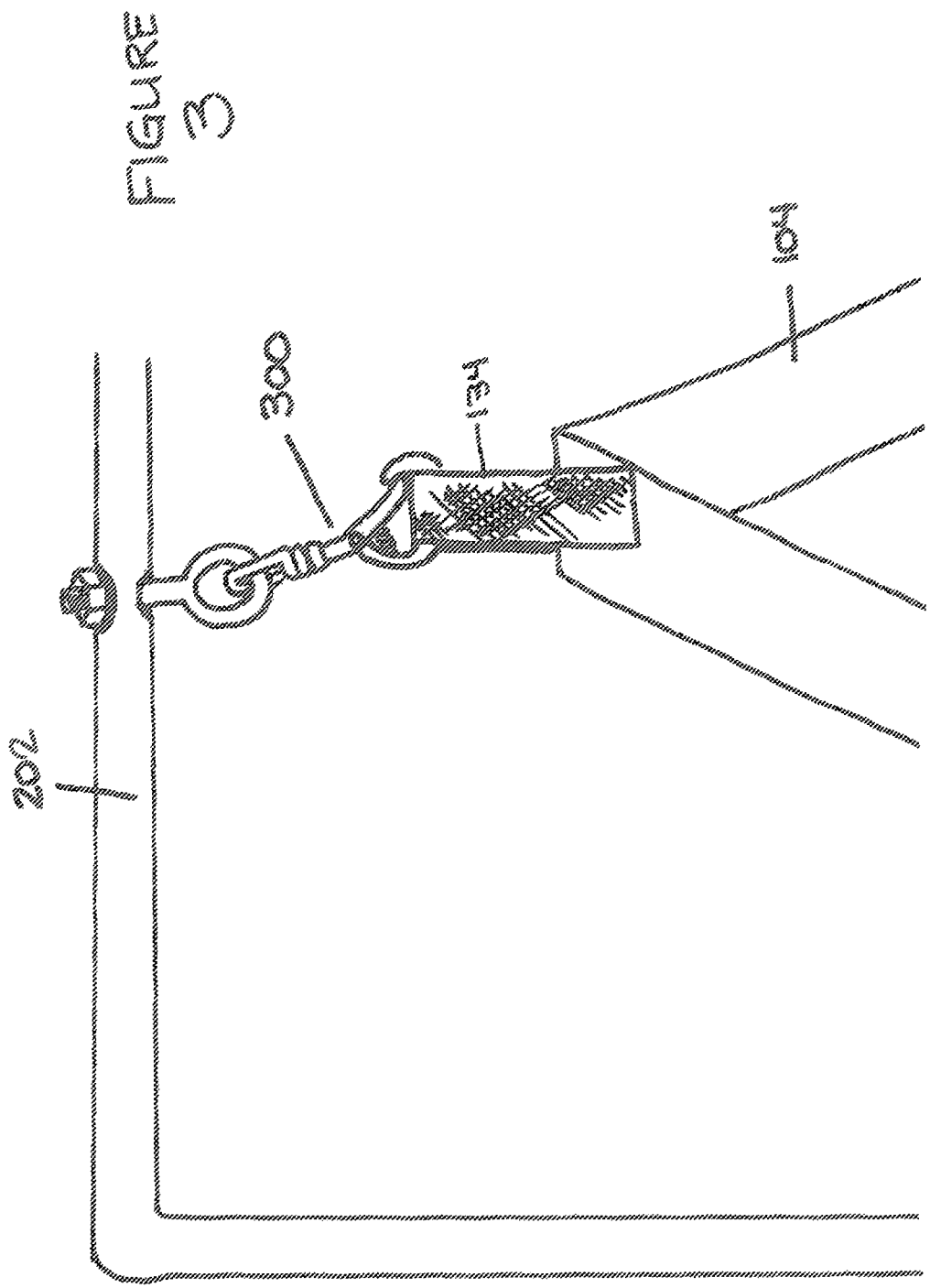

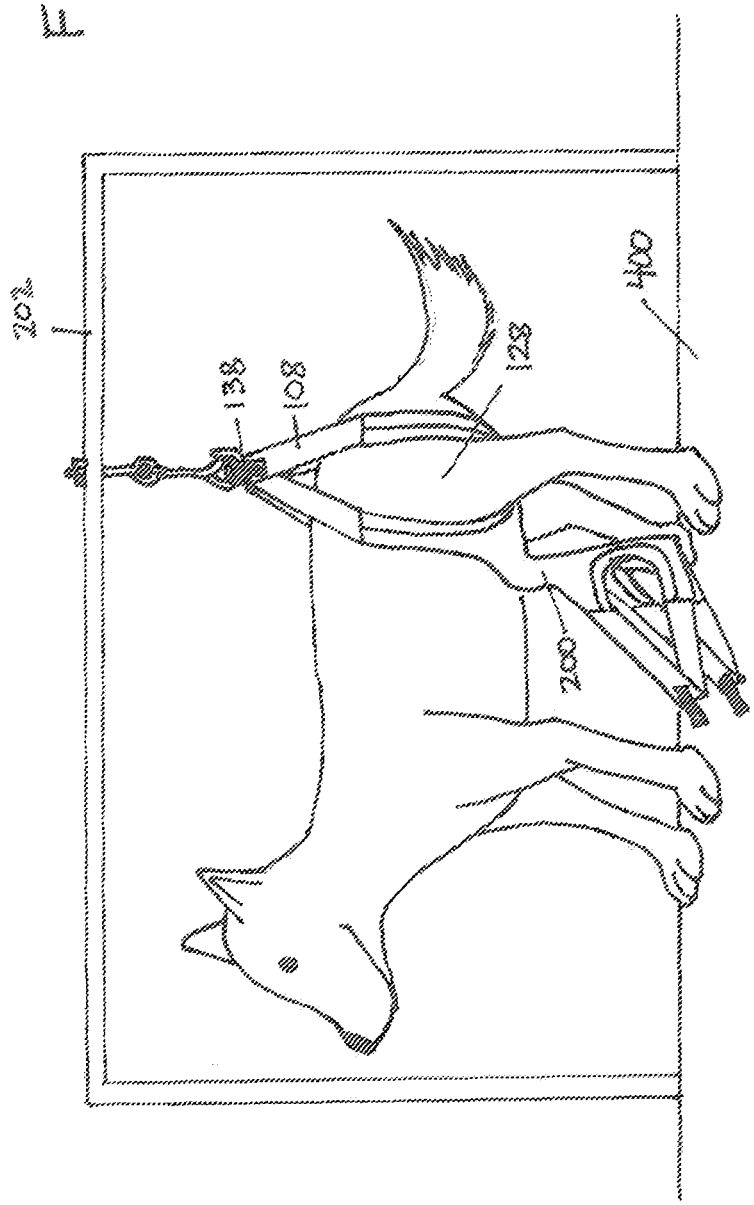

METHOD AND APPARATUS FOR ANIMAL GROOMING

FIELD OF INVENTION

The present invention relates in general to a method and apparatus for animal grooming and in particular to securing animals during the grooming process for ease and efficiency of grooming.

BACKGROUND

A common issue for animal groomers is getting the animal to be still while being groomed safely. This can be especially difficult if the animal is having its feet groomed or if the animal is required to stand for a long period of time while being groomed.

Prior solutions to these issues included suspending the animal in the air in a sling, supporting the animal's belly, hips, or shoulders with bands and straps, or tying the animal to a post with a leash-like apparatus. These apparatuses often must be used with each other during the grooming process in order to groom every part of the animal.

One such apparatus, available from the M.D.C. Romani, Inc. catalog, is a support sling that purports to hold an animal that won't let you trim their nails or feet. This sling purports to be a rectangular shaped piece of fabric with leg holes cut through it and grommet holes for attaching the sling to a support structure. A major advantage of the present invention is that the support member configuration allows almost total access to the animal for grooming, without compromising the support of the animal.

Other known apparatuses, available from the M.D.C. Romani, Inc. catalog, include single belly bands or straps which purport to be used to prevent the animal from sitting down, from stepping off the grooming table, or to support weak or older animals during the grooming procedure. The present invention can be easily converted to provide the same functions as these other apparatuses. The adaptability of the present invention eliminates the need for multiple apparatuses and saves time and cost during the grooming process. Another advantage of the present invention is that the animal is not restrained by the neck by the apparatus.

SUMMARY

The present invention is a method and apparatus for safely and securely holding and supporting an animal while it is being groomed. The disclosed apparatus can have multiple support members that wrap around an animal, passing under the animal's belly, around the hips and shoulders, and up over the back where it can be secured to a frame or post to keep the animal stable and supported, without restraining the animal by the neck, while undergoing a grooming procedure. The cutouts and support members that make up the leg holes in the apparatus can be lined with a soft material, such as fleece, to provide comfort and prevent chafing to the animal's skin during the procedure.

BRIEF DESCRIPTION OF THE DRAWINGS

FIG. 3 is a close up view of an anchor embodiment;

FIG. 4 is an alternate view of one embodiment in an alternate operational, or partially closed, position as when used in grooming a subject animal.

DESCRIPTION

Figure 1:
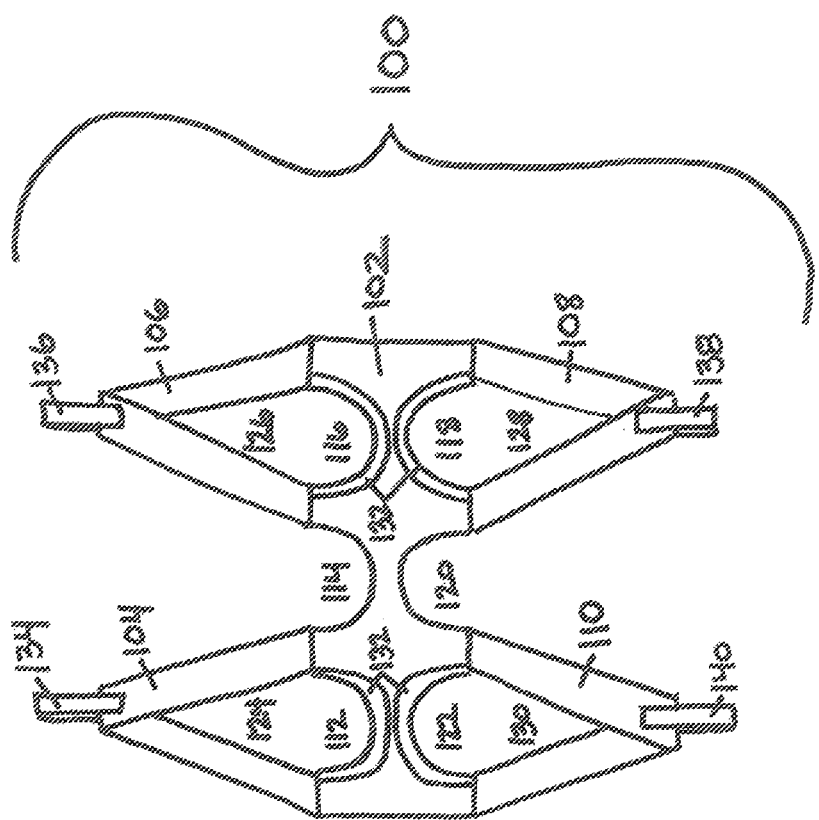
FIG. 1 is a top view of one embodiment of the invention in the open position.

With reference to FIG. 1, an embodiment of the apparatus 100 is shown in the open position. The open position is defined by the state of the apparatus 100, specifically, when the apparatus 100 does not contain or is not otherwise positioned on an animal. The body 102, the first support member 104, second support member 106, third support member 108, and fourth support member 110 of the apparatus 100 can be made of a lightweight, durable material such as nylon. Other suitable materials for construction of the apparatus 100 can include reinforced rip-stop nylon, canvas, or polyester. One embodiment of the apparatus 100 can be constructed from nylon, which can prevent the animal's hair from sticking to the apparatus 100. Formed into the body 102 of the apparatus 100 can a first cutout 112, a second cutout 114, a third cutout 116, a fourth cutout 118, a fifth cutout 120 and a sixth cutout 122. According to one embodiment, the first through sixth cutouts 112, 114, 116, 118, 120, and 122, can have an arched, or semi-circular shape. The first support member 104 can be connected to the base of the first cutout 112 thereby forming the first leg opening 124. The second support member 106 can be connected to the third cutout 116 thereby forming the second leg opening 126. The third support member 108 can be connected to the fourth cutout 118 thereby forming the third leg opening 128 and the fourth support member 110 can be connected to the sixth cutout 122 thereby forming the fourth leg opening 130. The second cutout 114 and fifth cutout 120 can reduce the weight and coverage of the apparatus 100 without reducing the support offered to the animal. The first through fourth leg openings 124, 126, 128, and 130, can be lined 132 with soft material, such as fleece, to provide comfort and prevent chafing to an animal while wearing the apparatus 100. Other materials suitable for lining 132 the first through fourth leg openings 124, 126, 128, and 130, could include cotton, wool, polyester, or a blend thereof. In one embodiment, the lining 132 of the first through fourth leg openings 124, 126, 128, and 130, can be located only on the portion of each opening comprised by the first cutout 112, the third cutout 116, the fourth cutout 118, or the sixth cutout 130. Other embodiments could have the lining 132 located on any portion, up to the entire circumference, of the first through fourth leg openings 124, 126, 128, and 130. Each of the four support members 104, 106, 108, and 110, can comprise a single strip of material that can be folded or looped over and attached to the body 102 of the apparatus 100 at the base of the first cutout 112, third cutout 116, fourth cutout 118, and sixth cutout 122. An alternative embodiment could have differing attachment points for the first through fourth support members 104, 106, 108, and 110, or could comprise two continuous strips of material that are threaded through the body 102. The first through fourth support members 104, 106, 108, and 110 could also be formed from a single sheet of material, a single sheet of material that can be folded over and attached back upon itself, or one or more layers of material stitched together at the edges. According to another embodiment, the whole apparatus 100 could be formed of a single piece of material, a single sheet that can folded into one or more layers and attached back upon itself, or one or more sheets of material. One or more layers or components can be attached to each other by stitching them together using reinforced or waterproof stitches, or a combination thereof. A first anchor 134 can be located at the fold or looping point of the first support member 104. A second anchor 136, a third anchor 138, and a fourth anchor 140 can be located at the fold or looping point of the second support member 106, third support member 108, and fourth support member 110 respectfully. The first through fourth anchors 134, 136, 138, and 140 can consist of nylon webbing, grommet holes, metal clips, carabineers, cable, rope, or other materials. In one embodiment, the first through fourth anchors 134, 136, 138, and 140 can be nylon webbing which can be permanently secured to the first through fourth support members 104, 106, 108, and 110 by stitching, reinforced stitching, waterproof stitching or a combination thereof.

Figure 2:
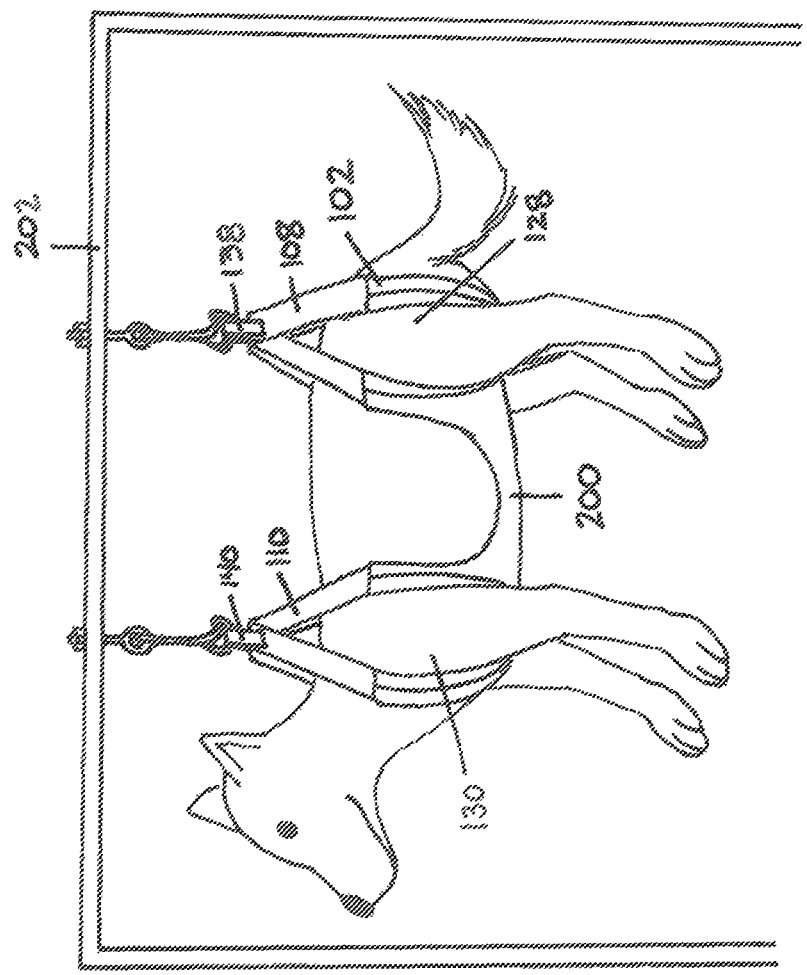
FIG. 2 is a side view of an apparatus embodiment shown in an operational, or closed, position as when used in grooming a subject animal.

With reference to FIGS. 1-2, the central portion 200 of the body 102 can run lengthwise under the belly of the animal. FIG. 2 shows the apparatus 100 in an operational, or closed position, as when the apparatus 100 is being used to support or hold an animal for grooming. The animal's legs can be placed through the first through fourth leg openings, 124, 126, 128, and 130, wherein the sides of the first through sixth cutouts 112, 114, 116, 118, 120, and 122, can wrap up and around the sides of the animal, without restraining the animal by the neck. The first through fourth support members 104, 106, 108, and 110 can extend from the body 102 of the apparatus 100 up and over the animal where they can be secured to a frame 202 using the first through fourth anchors 134, 136, 138, and 140. According to one embodiment, the apparatus 100 and frame 202 can fully support the weight of the animal, and the animal can be suspended in the air thereby allowing the groomer access the animal's feet and nails for grooming while the apparatus can prevent the animal from moving away or resisting the groomer, without restraining the animal's neck. The frame 202 can consist of metal, plastic, or other materials suitable for supporting the weight of an animal. The first through fourth anchors 134, 136, 138, and 140 can be attached or secured to the frame 202 through use of clips, hooks, support members, or similar means that are suitable for supporting the weight of an animal. Frame 202 and attachment means can be selected by a person of ordinary skill in the art.

With continued reference to FIGS. 1-2, the unique configuration of the apparatus 100, specifically the first through fourth support members 104, 106, 108, and 110, the first through fourth leg openings, 124, 126, 128, and 130, and the second cutout 114 and fifth cutout 120, can give the groomer nearly total access to the animal's flanks which could allow the groomer to bathe, shampoo, and trim the animal's coat with minimal adjustment or repositioning of the apparatus.

With reference to FIGS. 3-4, one embodiment can utilize clips 300, hooks, or other easily removed attachment means to connect the first through fourth anchors 134, 136, 138, and 140, to the frame 202 can allow the groomer to quickly lower one side. FIG. 4 shows an embodiment of the apparatus 100 in an alternative operational, or partially closed position wherein one or more, but not all, of the first through fourth support members 104, 106, 108, and 110, are released from the frame 202, exposing remaining areas for grooming without compromising the support of the animal. According to this embodiment, the groomer can optionally remove the first anchor 134 from its clip 300 and lower only the first support member 104, which can allow the groomer access to the upper leg and side of the animal while still supporting the animal through the second through fourth support members 106, 108, and 110. Also according to this embodiment, the groomer can optionally remove more than one of the first through fourth anchors 134, 136, 138, and 140. One example could have the groomer remove the first anchor 134 and the fourth anchor 140 to expose more of the animal for grooming, while leaving the second anchor 136 and the third anchor 138 secured to the frame 202, thereby supporting and holding one end of the animal while grooming the now exposed end.

With reference to FIG. 4, another embodiment allows the groomer to reposition the apparatus 100 with respect to the frame 202 so that the animal can stand on the grooming surface 400. This allows the groomer to convert the apparatus 100 to a single support setup without completely removing the apparatus 100 from the animal. This can allow one or more of the first through fourth support members 104, 106, 108, and 110, to support the animal's hips or shoulders, which can prevent the animal from sitting, or can provide support to older animals. The grooming surface 400 can comprise a grooming table, the floor, or other surfaces suitable to support an animal during grooming. The proper surface can be selected by a person of ordinary skill in the art depending on the desired application.

While the present invention has been described in connection with various illustrative embodiments, it is to be understood that other similar embodiments may be used or modifications and additions may be made to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. Therefore, the present invention should not be limited to any single embodiment, but rather construed in breadth and scope in accordance with the recitations of the appended claims.

I claim:

1. An apparatus for animal grooming comprising:
   a. a body;
   b. a first cutout, a second cutout, a third cutout, a fourth cutout, a fifth cutout, and a sixth cutout;
   c. a first support member, wherein said first support member is fixed to said body at the base of said first cutout;
   d. a second support member, wherein said second support member is fixed to said body at the base of said third cutout;
   e. a third support member, wherein said third support member is fixed to said body at the base of said fourth cutout;
   f. a fourth support member, wherein said fourth support member is fixed to said body at the base of said sixth cutout;
   g. a first anchor, wherein said first anchor is fixed to said first support member;
   h. a second anchor, wherein said second anchor is fixed to said second support member;
   i. a third anchor, wherein said third anchor is fixed to said third support member; and,
   j. a fourth anchor, wherein said fourth anchor is fixed to said fourth support member.

2. The animal apparatus of claim 1 wherein the material of said body is comprised of nylon.

3. The animal apparatus of claim 2 wherein the material of said body further comprises rip-stop nylon.

4. The animal apparatus of claim 3 wherein said body further comprises one or more layers of rip-stop nylon.

5. The animal apparatus of claim 1 wherein said first through fourth support members are comprised of nylon.

6. The animal apparatus of claim 5 wherein said first through fourth support members further comprise rip-stop nylon.

7. The animal apparatus of claim 6 wherein said first through fourth support members further comprise one or more layers of rip-stop nylon.

8. The animal apparatus of claim 1 wherein said first through fourth anchors further are comprised of nylon webbing.

9. The animal apparatus of claim 1 wherein said first cutout, said third cutout, said fourth cutout, and said sixth cutout, are lined with material.

10. The animal apparatus of claim 9 wherein said material is comprised of fleece.

11. The animal apparatus of claim 9 wherein said material is selected from the group consisting of cotton, wool, polyester, and a blend thereof.

12. An apparatus for animal grooming comprising:
 a. a body, wherein said body is comprised of one or more layers of rip-stop nylon;
 b. a first cutout, a second cutout, a third cutout, a fourth cutout, a fifth cutout and a sixth cutout, wherein said first cutout, said third cutout, said fourth cutout, and said sixth cutout are lined with fleece;
 c. a first support member, wherein said first support member is fixed to said body at the base of said first cutout and said first support member is comprised of one or more layers of rip-stop nylon;
 d. a second support member, wherein said second support member is fixed to said body at the base of said third cutout and said second support member is comprised of one or more layers of rip-stop nylon;
 e. a third support member, wherein said third support member is fixed to said body at the base of said fourth cutout and said third support member is comprised of one or more layers of rip-stop nylon;
 f. a fourth support member, wherein said fourth support member is fixed to said body at the base of said sixth cutout and said fourth support member is comprised of one or more layers of rip-stop nylon;
 g. a first anchor, wherein said first anchor is fixed to said first support member and said first anchor is comprised of nylon webbing;
 h. a second anchor, wherein said second anchor is fixed to said second support member and said second anchor is comprised of nylon webbing;
 i. a third anchor, wherein said third anchor is fixed to said third support member and said third anchor is comprised of nylon webbing; and
 j. a fourth anchor, wherein said fourth anchor is fixed to said fourth support member and said fourth anchor is comprised of nylon webbing.

* * * * *